(12) United States Patent
Okashimo et al.

(10) Patent No.: US 10,669,393 B2
(45) Date of Patent: Jun. 2, 2020

(54) POWDER FOR THREE-DIMENSIONAL SHAPING AND THREE-DIMENSIONAL SHAPED OBJECT

(71) Applicant: NORITAKE CO., LIMITED, Nagoya-shi, Aichi (JP)

(72) Inventors: Akihiro Okashimo, Nagakute (JP); Daishi Yoshikawa, Nissin (JP)

(73) Assignee: NORITAKE CO., LIMITED, Nagoya (JP)

( * ) Notice: Subject to any disclaimer, the term of this patent is extended or adjusted under 35 U.S.C. 154(b) by 52 days.

(21) Appl. No.: 16/018,641

(22) Filed: Jun. 26, 2018

(65) Prior Publication Data

US 2018/0298159 A1    Oct. 18, 2018

Related U.S. Application Data

(62) Division of application No. 15/077,270, filed on Mar. 22, 2016, now abandoned.

(30) Foreign Application Priority Data

Mar. 31, 2015   (JP) ................................ 2015-073297

(51) Int. Cl.
   *C08K 3/22*     (2006.01)
   *B33Y 70/00*    (2020.01)
   *B33Y 80/00*    (2015.01)

(52) U.S. Cl.
   CPC ............... *C08K 3/22* (2013.01); *B33Y 70/00* (2014.12); *B33Y 80/00* (2014.12); *C08K 2003/2227* (2013.01)

(58) Field of Classification Search
   CPC . C08K 3/08; C08K 3/10; C08K 3/105; C08K 3/11; C08K 3/20; C08K 2003/2227; B33Y 70/00; B33Y 80/00
   See application file for complete search history.

(56) References Cited

U.S. PATENT DOCUMENTS 9,782,935 B2 * 10/2017 Yamashita ............... B22F 3/003
2015/0158249 A1 * 6/2015 Goto ...................... B33Y 50/02
                                                      264/40.1

(Continued)

FOREIGN PATENT DOCUMENTS

JP    3607300 B2    1/2005
JP    4624626 B2    2/2011

(Continued)

OTHER PUBLICATIONS

Aug. 24, 2017 Office Action issued in Japanese Application No. 2015-073297.
Jan. 26, 2018 Office Action issued in U.S. Appl. No. 15/077,270.

*Primary Examiner* — Jun Li
(74) *Attorney, Agent, or Firm* — Oliff PLC

(57) ABSTRACT

An object of the present invention is to provide a powder for three-dimensional shaping that allows shaping a three-dimensional shaped object having excellent mechanical strength. The powder for three-dimensional shaping provided by the invention includes non-hydration reactive base particles and water-soluble bonding particles. Upon preparation of a slurry through addition of 50 parts by mass of water to 100 parts by mass of the powder, the viscosity of the slurry after 1 minute from addition of the water ranges from 30 mPa·s to 8000 mPa·s.

13 Claims, 2 Drawing Sheets

(56) References Cited

U.S. PATENT DOCUMENTS

| | | |
|---|---|---|
| 2015/0210016 A1 | 7/2015 | Okamoto |
| 2015/0218360 A1 | 8/2015 | Barber et al. |
| 2015/0251336 A1* | 9/2015 | Goto .................... B22F 3/1055 428/413 |
| 2016/0040025 A1* | 2/2016 | Norikane ............. C09D 103/02 106/157.2 |
| 2016/0271879 A1 | 9/2016 | Yamashita et al. |
| 2016/0339602 A1 | 11/2016 | Kato et al. |

FOREIGN PATENT DOCUMENTS

| | | |
|---|---|---|
| JP | 5589817 B2 | 9/2014 |
| JP | 2016-172416 A | 9/2016 |
| JP | 2016-172429 A | 9/2016 |
| WO | 98/09798 A1 | 3/1998 |
| WO | 01/34371 A2 | 5/2001 |

\* cited by examiner

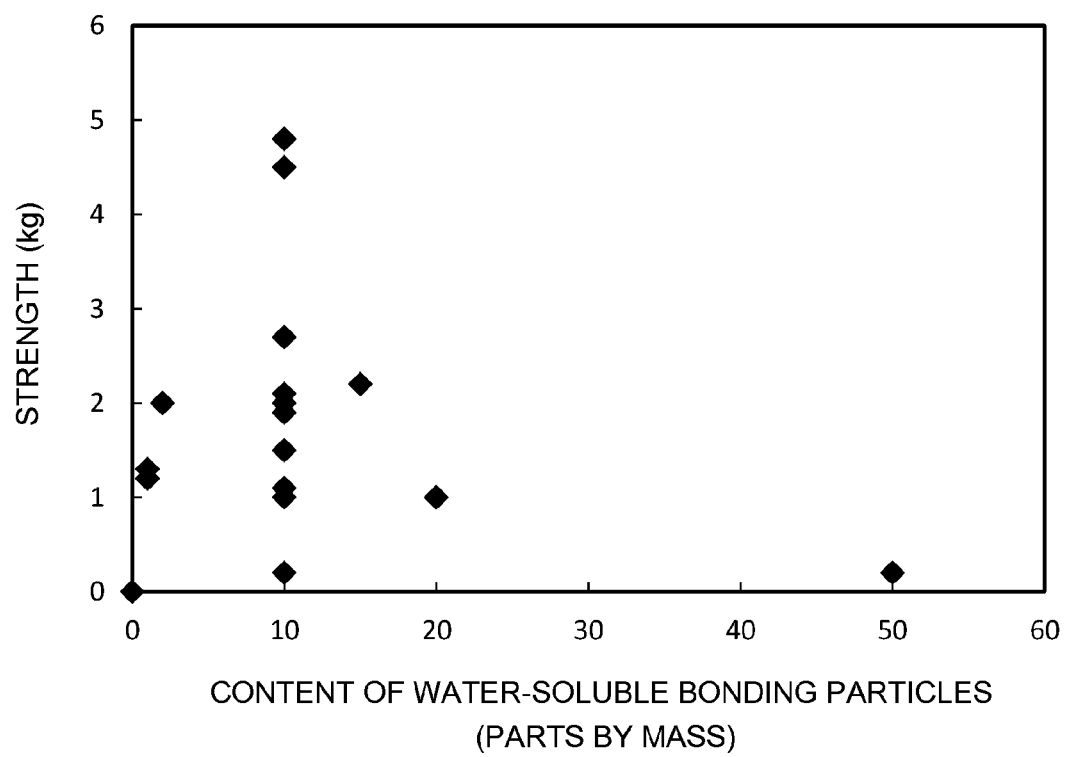

POWDER FOR THREE-DIMENSIONAL SHAPING AND THREE-DIMENSIONAL SHAPED OBJECT

This is a Divisional of application Ser. No. 15/077,270 filed Mar. 22, 2016. The entire disclosures of the prior application is hereby incorporated by reference herein their entirety.

BACKGROUND OF THE INVENTION

1. Field of the Invention

The present invention relates to a powder for three-dimensional shaping and to a three-dimensional shaped object.

The present international application claims priority based on Japanese Patent Application No. 2015-073297, filed on Mar. 31, 2015, the entire contents of which are incorporated in the present specification by reference.

2. Description of the Related Art

Technologies are known that involve mixing a water-containing shaping solution with at least part of a thin layer of a powder for three-dimensional shaping, solidifying the mixture, and repeatedly laying up solidified thin layers, to shape as a result a three-dimensional shaped object (see for instance Japanese Patent No. 3607300 and Japanese Patent No. 5589817). Typical configurations of powders for three-dimensional shaping that are used in such kind of additive manufacturing include, for instance, configurations in which the powder includes a filler and a water-soluble adhesive. For example, Japanese Patent No. 3607300 discloses a particulate mixture that includes a filler and a water-soluble adhesive, wherein the particulate mixture includes starch as the filler and sucrose as the water-soluble adhesive. Further, Japanese Patent No. 3607300 discloses a feature wherein, when an activating fluid having water as a solvent is injected into a layer of the particulate mixture, a water-soluble adhesive contained in the particulate mixture dissolves to wet the particulate mixture and adhesively bond filler particles to each other, whereby a cross-section portion of an article is formed.

SUMMARY OF THE INVENTION

Powders for three-dimensional shaping that are used in the abovementioned additive manufacturing are required to exhibit excellent mechanical strength so as to preclude breakage of the obtained three-dimensional shaped object. Japanese Patent No. 3607300 discloses a technology that involves reinforcing the strength of a final article by using a particulate mixture that includes reinforcing fibers such as cellulose. Even when relying on the above technology, however, sufficient strength may fail to be obtained immediately after molding since the shaped body is formed as a result of complex reactions, depending on the formulation. Japanese Patent No. 5589817 discloses a technology of enhancing planarity by imparting flowability such that a total energy amount measured by powder rheometry lies within a specific range, to a powder material that is used for three-dimensional shaping. However, a high-strength three-dimensional shaped object as described above cannot be achieved by focusing only on the flowability of the powder material.

In view of the above, it is a main object of the present invention to provide a suitable powder for three-dimensional shaping that allows shaping a three-dimensional shaped object having excellent mechanical strength. A related object of the present invention is to provide a high-strength three-dimensional shaped object that is shaped using such a powder for three-dimensional shaping.

The present invention provides a powder for three-dimensional shaping, to achieve the above objects. The powder for three-dimensional shaping disclosed herein includes non-hydration reactive base particles and water-soluble bonding particles. Upon preparation of a slurry through addition of 50 parts by mass of water to 100 parts by mass of the powder, the viscosity of the slurry after 1 minute from addition of the water ranges from 30 mPa·s to 8000 mPa·s. The viscosity of the slurry denotes herein viscosity that can be measured using a commercially available vibrational viscometer. For instance, the viscosity of the slurry after 1 minute from addition of water can be measured easily by immersing in the slurry the probe tip of a standard vibrational viscometer in the technical field in question (for instance, a vibrational viscometer that conforms to JIS Z 8803:2011 "Methods for viscosity measurement of liquids").

The powder for three-dimensional shaping disclosed herein has thus a viscosity characteristic as described above and, as a result, the water-soluble bonding particles dissolve in water when mixed with a water-containing shaping solution; the water-soluble bonding particles spread uniformly thereby between the non-hydration reactive base particles, and a strong adhesive strength is elicited between the particles. By using a powder for three-dimensional shaping having the above configuration, therefore, it becomes possible to fabricate a high-quality three-dimensional shaped object having superior mechanical strength as compared with conventional ones.

In one preferred implementation of the powder for three-dimensional shaping disclosed herein, the average particle size of the non-hydration reactive base particles ranges from 1 μm to 80 μm. By prescribing the average particle size of the non-hydration reaction base particles to lie within that range, it becomes possible to secure effectively a suitable viscosity of the slurry, and obtain a three-dimensional shaped object that delivers yet better performance.

In one preferred implementation of the powder for three-dimensional shaping disclosed herein, the content of the water-soluble bonding particles ranges from 1 part by mass to 20 parts by mass with respect to 100 parts by mass as the total amount of the powder. Enhancement of mechanical strength can be realized at a yet higher level when the content of water-soluble bonding particles lies within such a range.

In one preferred implementation of the powder for three-dimensional shaping disclosed herein, the water-soluble bonding particles are made up mainly of at least one type selected from the group consisting of thermoplastic resins, thermosetting resins and polysaccharides. A performance enhancing effect (for instance, effect of enhancing mechanical strength) derived from having the viscosity characteristic described above is readily achieved herein through the use of any one from among thermoplastic resins, thermosetting resins and polysaccharides.

In one preferred implementation of the powder for three-dimensional shaping disclosed herein, the non-hydration reactive base particles are made up mainly of a metal containing at least one element selected from the group consisting of Al, Zr, Ti, Zn, Ni and Fe, or an alloy of the foregoing elements. Metals and alloys containing the foregoing elements boast high hardness and high stability towards water, and accordingly can be advantageously used as non-hydration reactive base particles that are suitable for the purpose of the present invention.

In one preferred implementation of the powder for three-dimensional shaping disclosed herein, the non-hydration reactive base particles are made up mainly of an oxide containing at least one element selected from the group consisting of Al, Zr, Ti, Zn, Ni, Fe and Si. Oxides containing these metal elements or metalloid elements boast high hardness and high stability towards water, and accordingly can be advantageously used as non-hydration reactive base particles that are suitable for the purpose of the present invention.

The present invention provides also a three-dimensional shaped object that is formed by solidifying a mixture of a water-containing shaping solution with any one of the powders for three-dimensional shaping disclosed herein. The three-dimensional shaped object is shaped using the powder for three-dimensional shaping described above, and accordingly can exhibit better mechanical strength than conventional ones.

BRIEF DESCRIPTION OF THE DRAWINGS

FIG. 2 is a graph illustrating a relationship between the content of water-soluble bonding particles and strength.

DESCRIPTION OF THE PREFERRED EMBODIMENTS

Figure 1:
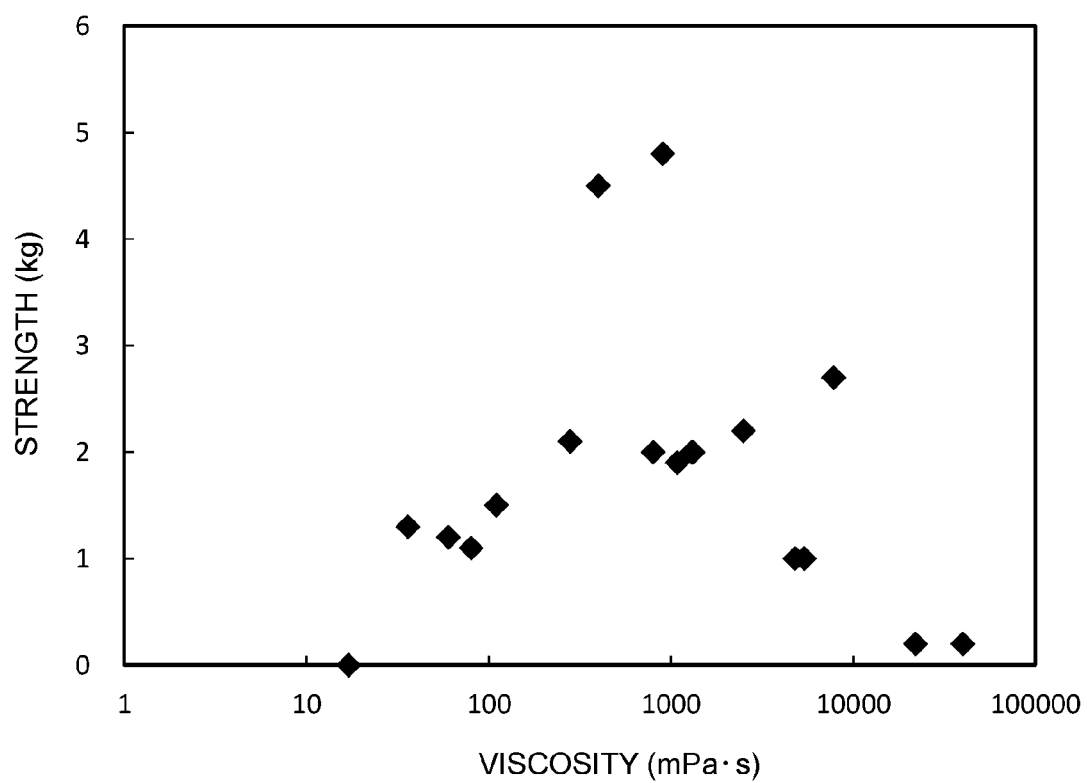
FIG. 1 is a graph illustrating the relationship between the viscosity α of a slurry and strength.

Preferred embodiments of the present invention will be explained next. Any features other than the features specifically set forth in the present description and which may be necessary for carrying out the present invention can be regarded as instances of design matter for a person skilled in the art on the basis of known techniques in the technical field in question. The present invention can be carried out thus on the basis of the features disclosed in the present description and on the basis of common technical knowledge in the relevant technical field.

<Powder for Three-Dimensional Shaping>

The powder for three-dimensional shaping according to one preferred implementation of the present technology disclosed herein is a powder for three-dimensional shaping that is used in order to shape a three-dimensional shaped object. The powder for three-dimensional shaping is made up of a mixed powder that includes at least non-hydration reactive base particles and water-soluble bonding particles. Upon preparation of a slurry through addition of 50 parts by mass of water to 100 parts by mass of the powder, the viscosity α of the slurry after 1 minute from addition of the water ranges from 30 mPa·s to 8000 mPa·s. The viscosity α of the slurry, the non-hydration reactive base particles, the water-soluble bonding particles, a shaping solution, a shaping method, and a method for fabricating the three-dimensional shaped object will be explained next in succession.

<Slurry Viscosity α>

In the present description the viscosity α of a slurry is measured as described below. Specifically, a slurry is prepared by adding 50 parts by mass of water to 100 parts by mass of a powder for three-dimensional shaping, with kneading for 30 seconds. The slurry is poured into a container, and the surface of the slurry is flattened. The viscosity α (mPa·s) of the slurry can be obtained by introducing the probe tip of a vibrational viscometer (for instance, vibrational viscometer model "VM-100A", by SEKONIC CORPORATION") into the slurry, and measuring then a value at the point in time at which one minute has elapsed from addition of water. As referred to in the present description, the viscosity α of the slurry designates a value measured at a liquid temperature ranging from 20° C. to 22° C.

The viscosity α of the slurry of the powder for three-dimensional shaping disclosed herein, based on the above viscosity measurement, is set to be equal to or smaller than 8000 mPa·s. As a result, it becomes possible to increase the mechanical strength of a three-dimensional shaped object shaped using the above powder, as compared with a conventional powder for three-dimensional shaping having a viscosity α of the slurry in excess of 8000 mPa·s.

Specifically, findings by the inventors have revealed that in a powder for three-dimensional shaping that exhibits an excessively high viscosity α of the slurry, the water-soluble bonding particles dissolve in water upon mixing of the powder with a water-containing shaping solution, and the slurry becomes excessively thick; In consequence, water having the water-soluble bonding particles dissolved therein does not spread uniformly between the non-hydration reactive base particles. As a result, sufficient adhesive strength fails to be brought out among non-hydration reactive base particles, and the mechanical strength of the three-dimensional shaped object that is shaped using the powder tends to drop.

In the present configuration, by contrast, the viscosity α of the slurry at the point in time at which 1 minute has elapsed from addition of 50 parts by mass of water are added to 100 parts by mass of the powder for three-dimensional shaping, with kneading, is kept not higher than 8000 mPa·s. Upon mixing with the water-containing shaping solution, therefore, the slurry is thickened suitably through dispersion of the water-soluble bonding particles with water, and, as a result water having the water-soluble bonding particles dissolved therein spreads uniformly between the non-hydration reactive base particles. Accordingly, strong adhesive strength is elicited between the non-hydration reactive base particles, and the mechanical strength of the three-dimensional shaped object that is shaped using the powder can be enhanced as compared with conventional instances.

The viscosity α of the slurry based on the above viscosity measurement of the powder for three-dimensional shaping disclosed herein is ordinarily α≤8000 mPa·s, and is preferably α≤6000 mPa·s, more preferably α≤5000 mPa·s, yet more preferably α≤3000 mPa·s and particularly preferably α≤1000 mPa·s, in terms for instance of increasing mechanical strength. On the other hand, a powder for three-dimensional shaping in which the above viscosity α of the slurry is lower than 30 mPa·s undergoes no significant thickening when mixed with the water-containing shaping solution, and, as a result water having the water-soluble bonding particles dissolved therein does not remain properly between the non-hydration reactive base particles. In consequence, the mechanical strength of the three-dimensional shaped object that is shaped using the powder may contrariwise decrease in some instances. Further, water having the water-soluble bonding particles dissolved therein may in some cases permeate up to a portion of the powder for three-dimensional shaping that should not solidify (typically, a thin layer filled with the powder in a layered fashion), and the shape accuracy of the three-dimensional shaped object constructed using the powder tends to drop. In terms for instance of enhancing shape accuracy, the above viscosity α of the slurry is about 30 mPa·s≤α, preferably 50 mPa·s≤α, more preferably 100 mPa·s≤α, and particularly preferably 200 mPa·s≤α. For instance a powder for three-dimensional shaping having a viscosity α of the slurry in the range 30 mPa·s≤α≤8000 mPa·s (further, in the range 200 mPa·s≤α≤5000 mPa·s, and particularly in the range 400 mPa·s≤α≤900 mPa·s), is preferred from the viewpoint of combining mechanical strength and shape accuracy at a high level.

The viscosity α of the slurry based on the above viscosity measurement of a powder for three-dimensional shaping can be adjusted for instance by modifying the material and/or properties (for instance, average particle size and specific surface area) of the non-hydration reactive base particles contained in the powder for three-dimensional shaping. Generally, the viscosity α of the slurry based on the above viscosity measurement tends to increase as the average particle size of the non-hydration reactive base particles becomes smaller (increasing specific surface area). Therefore, the above viscosity α of the slurry of the powder for three-dimensional shaping can be adjusted to lie within the appropriate ranges disclosed herein by properly selecting the average particle size and the specific surface area of the non-hydration reactive base particles in the powder for three-dimensional shaping. As a method for adjusting the above viscosity α of the slurry of the powder for three-dimensional shaping so as to lie within the appropriate range disclosed herein, a method can be resorted to that involves, for instance, modifying the content (proportion) of the non-hydration reactive base particles in the powder, as well as the type content (proportion), degree of polymerization and molecular weight of the water-soluble bonding particles. Methods for controlling the above viscosity α of the slurry may be resorted to singly or in combination.

<Non-Hydration Reactive Base Particles>

The powder for three-dimensional shaping disclosed herein contains non-hydration reactive base particles. As used herein, the term "non-hydration reactive base particles" denotes a substance in which no hydration reaction (typically, generation of a hydrate or generation of a hydroxide) occurs when particles of the substance come into contact with water, of even if such a hydration reaction occurs, the reaction is limited to a microscopic area on the surface of the particles, while the majority of the latter do not substantially react with water. Therefore, the non-hydration reactive base particles encompass herein conceptually also instances where water molecules react locally at the surface of the particles in small amounts (for instance, 0.1 moles or less, preferably 0.01 moles or less and more preferably 0.001 moles or less) with respect to 1 mole of the non-hydration reactive base particles. Typical examples of substances that undergo hydration reactions include, for instance, gypsum, cement and the like. The non-hydration reactive base particles are a constituent component of the base material of the three-dimensional shaped object that is to be shaped.

The material and/or properties of the non-hydration reactive base particles are not particularly limited, so long as the viscosity α of the slurry based on the viscosity measurement described above satisfies the above range. For instance, the non-hydration reactive base particles may be inorganic particles, organic particles or organic-inorganic composite particles. The non-hydration reactive base particles are preferably inorganic particles and, among the foregoing, preferably particles containing metallic or metalloid compounds. For instance, non-hydration reactive base particles made up mainly of an oxide, nitride or carbide of any element belonging to group 4 through group 14 of the periodic table can be suitably used herein. Preferred among the foregoing are non-hydration reactive base particles made up mainly of an oxide, nitride or carbide of a metal element or metalloid element from among any of Al, Zr, Ti, Zn, Ni, Fe and Si. Alternatively, non-hydration reactive base particles may be used that are made up mainly of a metal including any element belonging to group 4 through group 13 of the periodic table, or alloys of the those elements. Preferred among the foregoing are non-hydration reactive base particles made up mainly of any metal elements from among Al, Zr, Ti, Zn, Ni and Fe, or alloys of the foregoing elements.

Specific examples include, for instance, non-hydration reactive base particles made up mainly of oxide particles such as aluminum oxide (for instance, alumina) particles, zirconium oxide (for instance, zirconia) particles, titanium oxide (for instance titania) particles, silicon oxide (for instance silica) particles, zinc oxide particles, iron oxide particles, nickel oxide particles, cerium oxide (for instance, ceria) particles, magnesium oxide (for instance, magnesia) particles, chromium oxide particles, manganese dioxide particles, barium titanate particles, calcium carbonate particles, barium carbonate particles and the like; metallic particles such as aluminum particles, nickel particles and iron particles; nitride particles such as silicon nitride particles, boron nitride particles and the like; and carbide particles such as silicon carbide particles, boron carbide particles and the like. The non-hydration reactive base particles may be used singly as one type alone or in combinations of two or more types. Preferred among the foregoing are alumina particles, zirconia particles, titania particles, silica particles, zinc oxide particles, barium titanate particles, aluminum particles, nickel particles or iron particles, in terms of enabling formation of a high-strength three-dimensional shaped object. Alumina particles, zirconia particles, titania particles and silica particles are yet more preferred among the foregoing, alumina particles being particularly preferred.

In the present description, the wording "made up mainly of X" pertaining to composition of the non-hydration reactive base particles denotes a feature wherein the proportion of X (purity of X) in the non-hydration reactive base particles is 90% or higher (preferably, 95% or higher, more preferably 97% or higher, yet more preferably 98% or higher and for instance 99% or higher) on a mass basis.

The shape (outline) of the non-hydration reactive base particles is not particularly limited, and the particles may be spherical or aspherical. Substantially spherical non-hydration reactive base particles can be preferably used from the viewpoint of mechanical strength, ease of fabrication and so forth. The average particle size of the non-hydration reactive base particles is not particularly limited, so long as the viscosity α of the slurry based on a viscosity measurement described above satisfies the above range, and is ordinarily 1 μm or greater, preferably 10 μm or greater, more preferably 20 μm or greater, and particularly preferably 30 μm or greater (for instance, 40 μm or greater). The viscosity α of the slurry based on the above viscosity measurement can be effectively lowered by virtue of the fact that non-hydration reactive base particles have the above average particle size, and hence a high-strength three-dimensional shaped object can be realized yet more efficiently. The upper limit of the average particle size of the non-hydration reactive base particles is appropriately of about 80 μm or smaller from the viewpoint of moldability (for instance, moldability when the powder for three-dimensional shaping is filled in the form of a thin layer) or the like. The above average particle size is preferably 70 μm or smaller, and more preferably 60 μm or smaller (for instance, 50 μm or smaller) from the viewpoint of combining enhanced mechanical strength and moldability at a yet higher level.

The "average particle size" in the present description is not particularly limited, and refers to a 50% volume-average particle size (D50 size), i.e. a particle size at a cumulative value of 50% in a particle size distribution measured on the basis of a particle size distribution measuring device that utilizes laser scattering and diffraction. More specifically, the "average particle size" refers to 50% volume-average particle size obtained through dry measurement, without dispersion of particles by compressed air, using a laser diffraction-scattering-type particle size distribution measuring device.

The content of the non-hydration reactive base particles in the powder for three-dimensional shaping is not particularly limited, so long as the viscosity α of the slurry based on a viscosity measurement described above satisfies the above range. The content of the non-hydration reactive base particles is ordinarily 80 parts by mass or higher with respect to 100 parts by mass as the total amount of powder for three-dimensional shaping, and preferably 85 parts by mass or higher, more preferably 90 parts by mass or higher, in terms for instance of enhancing mechanical strength. The upper limit of the content of non-hydration reactive base particles is not particularly restricted, but is preferably 99 parts by mass or lower, more preferably 98 parts by mass or lower, and particularly preferably 96 parts by mass or lower. The effect of the present configuration can be elicited at a yet higher level within such ranges of content of non-hydration reactive base particles.

<Water-Soluble Bonding Particles>

The powder for three-dimensional shaping disclosed herein contains water-soluble bonding particles. The "water-soluble bonding particles" denote herein resin particles such that all or some of the particles dissolve when 2 parts by mass of the bonding particles are added to 100 parts by mass of water at a liquid temperature of 90° C., with stirring for 4 hours, so that, as a result, an aqueous solution having the bonding particles dissolved therein exhibits higher viscosity than that of water. In one preferred implementation, the aqueous solution having the above bonding particles dissolved therein exhibits viscosity at a level that exceeds 1.2×A (preferably 1.5×A, more preferably 2.0×A), where A (mPa·s) denotes the viscosity of water. The water-soluble bonding particles are a component which, upon mixing with the water-containing shaping solution, dissolves in water and binds thereby non-hydration reactive base particles to one another.

The material and properties of the water-soluble bonding particles are not particularly limited, so long as the viscosity α of the slurry based on the viscosity measurement described above satisfies the above range. For instance there are preferably used water-soluble bonding particles made up mainly of any one of thermoplastic resins, thermosetting resins and polysaccharides.

Specific examples of thermoplastic resins include, for instance, vinyl alcohol resins, isobutylene resins, polyamide resins, polyester resins and the like. Vinyl alcohol resins are typically resins (PVA) including vinyl alcohol units as the main repeating units. In the above resin, the proportion of the number of moles of the vinyl alcohol units in the number of moles of all repeating units is ordinarily 50% or higher (for instance, in the range 50% to 90%), preferably 65% or higher, more preferably 75% or higher, for instance 85% or higher. All repeating units may be substantially made up of vinyl alcohol units. The types of the repeating units other than vinyl alcohol units in PVA are not particularly limited, and may include for instance vinyl acetate units or the like. For instance there can be used anionically modified PVA or cationically modified PVA such as carboxyl group-modified PVA, sulfonate group-modified PVA, phosphate group-modified PVA or the like; or modified PVA obtained through copolymerization with ethylene, a vinyl ether having a long-chain alkyl group, a vinyl ester, (meth)acrylicamide, an olefin or the like. The degree of polymerization of PVA is not particularly limited, but can range for instance from 100 to 5000 (preferably, from 500 to 3000). The isobutylene resin may be a homopolymer of isobutylene or a copolymer (isobutylene copolymer) of isobutylene with other monomers. The other monomers that copolymerize with isobutylene in the isobutylene copolymer are not particularly limited. Examples thereof include, for instance, monomers having ethylenic double bonds. Examples of monomers having ethylenic double bonds include, for instance, monomers with ethylenically unsaturated carbons, such as maleic acid (anhydride), acrylic acid, methacrylic acid, phthalic acid (anhydride), itaconic acid (anhydride) and the like. Herein there may be used a chemically modified isobutylene copolymer. The molecular weight of the isobutylene copolymer is not particularly limited, but can range for instance from $3 \times 10^3$ to $2 \times 10^5$ (preferably, from $5 \times 10^3$ to $1.7 \times 10^5$). Examples of polyamide resins include, for instance, water-soluble nylon resulting from chemically modifying a nylon such as polycaproamide (nylon-6). Examples of polyester resins include, for instance, water-soluble polyesters in which a component having a hydrophilic group is introduced, as a copolymerization component, into a polyester. Among the foregoing thermoplastic resins, vinyl alcohol-based resins and isobutylene resins are preferred in that these resins afford strong adhesive forces, and allow adjusting easily the viscosity α of the slurry to lie into the above range.

Preferred examples of thermosetting resins include, for instance, melamine resins. The melamine resin may be herein a melamine resin obtained through a polymerization reaction of melamine and an aldehyde, or may be a copolymer resin of a monomer (or initial polymer thereof) that is used to form a melamine resin) and another monomer (or initial polymer thereof). The aldehyde that polymerizes with melamine in the melamine resin is not particularly limited. For instance, a melamine resin can be preferably used herein that is obtained as a result of a polymerization reaction between melamine and formaldehyde.

Preferred examples of polysaccharides include, for instance, cellulose derivatives such as hydroxypropyl methyl cellulose, hydroxyethyl methyl cellulose, hydroxyethyl cellulose, hydroxypropyl cellulose, methyl cellulose, ethyl cellulose, ethyl hydroxyethyl cellulose, carboxymethyl cellulose and the like, as well as natural polymer compounds such as gum arabic, xanthan gum, curdlan, starch, dextrin, glucomannan, agarose, carrageenan, guar gum, locust bean gum, tragacanth gum, quince seed gum, pullulan, agar, konjac mannan and the like. Among the foregoing, hydroxypropyl methyl cellulose, hydroxyethyl methyl cellulose, methyl cellulose, gum arabic and xanthan gum are preferably used in terms for instance of adhesion and ease of viscosity adjustment.

Other examples of the water-soluble bonding particles that may be incorporated into the powder for three-dimensional shaping disclosed herein include water-soluble bonding particles made up mainly of, for instance, polyethylene glycol, partially neutralized sodium polyacrylate, polyvinyl pyrrolidone, polyvinyl pyrrolidone copolymers, sodium polyacrylate, copolymers of sodium polyacrylate, sodium alginate, sucrose, dextrose, fructose, lactose, gelatin and the like. The water-soluble bonding particles described above may be used singly as one type or in combinations of two or more types.

In the present description, the wording "made up mainly of X" pertaining to the composition of the water-soluble bonding particles denotes a feature wherein the proportion of X (purity of X) in the water-soluble bonding particles is 90% or higher (preferably, 95% or higher, more preferably 97% or higher, yet more preferably 98% or higher and for instance 99% or higher) on a mass basis.

Although not particularly limited thereto, the average particle size of the water-soluble bonding particles is ordinarily 0.1 µm or greater, preferably 1 µm or greater. The upper limit of the average particle size of the water-soluble bonding particles is appropriately set to be about 250 µm or smaller, and is preferably 200 µm or smaller.

The content of the water-soluble bonding particles in the powder for three-dimensional shaping is not particularly limited, so long as the viscosity α of the slurry based on a viscosity measurement described above satisfies the above range. The content of the water-soluble bonding particles is ordinarily 1 part by mass or higher with respect to 100 parts by mass as the total amount of powder for three-dimensional shaping, and preferably 2 parts by mass or higher, more preferably 4 parts by mass or higher, in terms for instance of enhancing mechanical strength. The upper limit of the content of water-soluble bonding particles is not particularly limited, but is preferably 20 parts by mass or lower, more preferably 15 parts by mass or lower, and particularly preferably 10 parts by mass or lower. Within such a range of the content of the water-soluble bonding particles, the viscosity α of the slurry based on the above viscosity measurement decreases effectively, and a high-strength three-dimensional shaped object can be realized yet more efficiently.

In the technology disclosed herein, the water-soluble bonding particles and the non-hydration reactive base particles may be present not bonded to each other but as particles independent from each other. The desired powder for three-dimensional shaping can be easily achieved by virtue of the fact that the water-soluble bonding particles and the non-hydration reactive base particles are present as particles independent from each other. Alternatively, the water-soluble bonding particles may be adhered to the surface of the non-hydration reactive base particles. Specifically, part of the entirety of the non-hydration reactive base particles may be covered (coated) with the water-soluble bonding particles. As a result, the water-soluble bonding particles can be present, in the required amount, between non-hydration reactive base particles, and hence water having the water-soluble bonding particles dissolved therein can spread efficiently between the non-hydration reactive base particles. Accordingly, the above-described enhancing effect on the strength of the three-dimensional shaped object can be elicited yet more effectively.

The powder for three-dimensional shaping disclosed herein may further contain, as needed, known additives that are used in powders for three-dimensional shaping, for instance dispersants, thickeners, printing aids and the like, so long as the effect of the present configuration is not impaired thereby. The content of the above additives may be set in accordance with the purpose for which additives are added, and will not be explained in detail here since it is not a characterizing feature of the present invention.

The method for preparing the powder for three-dimensional shaping disclosed herein is not particularly limited. For instance, the various components contained in the powder for three-dimensional shaping may be mixed by relying on a known mixing method, for instance using a Polymix. The way in which the components are mixed is not particularly limited, and may involve for instance mixing all components at one time, or mixing the components according to an appropriately established sequence.

The powder for three-dimensional shaping disclosed herein is used in additive manufacturing in which a three-dimensional shaped object is shaped through repeated layering of solidified thin layers that are obtained through mixing of a water-containing shaping solution with at least part of the thin layer of the powder for three-dimensional shaping having been filled in a layered manner. The shape of the three-dimensional shaped object that is to be shaped is not particularly limited. The powder for three-dimensional shaping disclosed herein can be preferably used for shaping of shaped objects having various three-dimensional shapes.

<Shaping Solution>

The powder for three-dimensional shaping disclosed herein is typically used for shaping a three-dimensional shaped object in an implementation in which the powder for three-dimensional shaping is mixed with a water-containing shaping solution. Herein it suffices that the solvent used in the above shaping solution contains water. Examples of the solvent that can be preferably used include pure water, ultra-pure water, ion-exchanged water (deionized water), distilled water and the like. The shaping solution disclosed herein may further contain, as needed, an organic solvent (lower alcohol, lower ketone or the like) that is homogeneously miscible with water. Preferably, the 40 vol % or more of the solvent contained in the shaping solution is water, more preferably 50 vol % or more (typically, 50 to 100 vol %) of the solvent is water.

The shaping solution disclosed herein may further contain, as needed, known additives that can be used in shaping solutions, for instance dyes, organic pigments, inorganic pigments, wetting agents and flow enhancers, so long as the effect of the present configuration is not impaired thereby. The content of the above additives may be set in accordance with the purpose for which additives are added, and will not be explained in detail herein since it is not a characterizing feature of the present invention.

<Shaping Method>

The powder for three-dimensional shaping disclosed herein can be used for instance in an implementation that includes the operations below, to shape (fabricate) a three-dimensional shaped object. An explanation follows next on one preferred embodiment of a method for shaping a three-dimensional shaped object using the powder for three-dimensional shaping disclosed herein. Shaping can be carried out using a 3D printer for solid-shaping on the basis for instance of three-dimensional data corresponding to the three-dimensional shaped object that is to be shaped. Such a 3D printer can have an inkjet for dripping the water-containing shaping solution and a mounting table on which the powder for three-dimensional shaping is disposed.

To shape the three-dimensional shaped object there is prepared any one of the powders for three-dimensional shaping disclosed herein. Preparation of the powder for three-dimensional shaping involves, for instance, mixing the various components contained in the powder for three-dimensional shaping according to a known mixing method, for instance using a Polymix.

Operations 1 to 3 below are repeated next, to shape as a result the three-dimensional shaped object through sequential layering of a layer-like solid material. Operation 1: the above powder for three-dimensional shaping is filled in a layer-like manner on a mounting table, to a thickness (for instance in the range 0.01 mm to 0.3 mm) corresponding to each layer of the three-dimensional shaped object that is to be shaped. Operation 2: the water-containing shaping solution is dripped, out of an inkjet head, onto a portion to be solidified in the powder for three-dimensional shaping having been filled in a layer-like manner (i.e. portion corresponding to the part that is to be shaped in the three-dimensional shaped object). The water-soluble bonding particles contained in the drip portion dissolve and the non-hydration reactive base particles become thereby bonded to each other. A layer-like solid material becomes formed (solidified) as a result. Operation 3: the mounting table is lowered vertically by the extent of a thickness corresponding to each layer of the above three-dimensional shaped object.

Thereafter, the powder for three-dimensional shaping that has not solidified is removed lastly, to complete the shaping of the three-dimensional shaped object. The three-dimensional shaped object having been shaped using the powder for three-dimensional shaping disclosed herein may be fired after shaping. The firing temperature is not particularly limited, but is preferably set to lie for instance in the range from 600° C. to 1800° C. A three-dimensional shaped object of yet higher strength can be formed as a result. The three-dimensional shaped object after shaping may be then immersed in a firing aid and be subsequently fired, as needed. A three-dimensional shaped object of yet higher strength can be formed as a result.

<Method for Fabricating a Three-Dimensional Shaped Object>

The technology disclosed herein there encompasses, for instance, a method for fabricating a three-dimensional shaped object. Specifically, the method according to the technology disclosed herein includes a step of preparing a the powder for three-dimensional shaping that includes the non-hydration reactive base particles and the water-soluble bonding particles; and a step of mixing the water-containing shaping solution with at least part of a thin layer of the powder for three-dimensional shaping having been filled in a layer-like manner, solidifying the mixture, and repeatedly laying up solidified thin layers, to shape as a result a three-dimensional shaped object. Upon preparation of a slurry through addition of 50 parts by mass of water to 100 parts by mass of the powder for three-dimensional shaping, with kneading in the step of preparing the above powder for three-dimensional shaping in this method for fabricating a three-dimensional shaped object, the powder for three-dimensional shaping is prepared such that the viscosity of the slurry after 1 minute from addition of the water ranges from 30 mPa·s to 8000 mPa·s. The above fabrication method is carried out by resorting preferably to the features of the powder for three-dimensional shaping and the shaping method disclosed herein. The above fabrication method provides a high-quality three-dimensional shaped object having superior mechanical strength as compared with conventional instances.

Various examples pertaining to the present invention will be explained next, but the present invention is not meant to be limited to or by the examples.

Preparation of a Powder for Three-Dimensional Shaping

Example 1

A powder for three-dimensional shaping was prepared through stirring of non-hydration reactive base particles and water-soluble bonding particles in a Polymix for 30 seconds.

Alumina particles having an average particle size of 40 μm were used as the non-hydration reactive base particles. Polyvinyl alcohol (PVA, Poval 205S by Kuraray Co., Ltd.) was used as the water-soluble bonding particles.

The content of the non-hydration reactive base particles is 90 parts by mass and the content of the water-soluble bonding particles is 10 parts by mass, with respect 100 parts by mass of the powder for three-dimensional shaping.

<Measurement of Slurry Viscosity α>

Herein 4 g of water were added to 8 g of the above powder for three-dimensional shaping, and the whole was kneaded for 30 seconds in a rubber bowl, to prepare a slurry. The slurry was placed in a plastic container having diameter 36 mm×length 32 mm, while avoiding entrapment of bubbles, and the surface of the slurry was flattened using a spatula. The viscosity α of the slurry at a point in time where 1 minute had elapsed from addition of water and kneading was measured using a vibrational viscometer model "VM-100A" by Sekonic Corporation (liquid temperature 20 to 22° C.). The result yielded a viscosity α of the above slurry of 800 mPa·s.

Example 2

A powder for three-dimensional shaping and slurry according to the present example were prepared in the same way as in Example 1, but herein a melamine resin (National melamine, by Kayo Corporation) was used, instead of PVA, as the water-soluble bonding particles. The viscosity α of the slurry was 80 mPa·s.

Example 3

A powder for three-dimensional shaping and slurry according to the present example were prepared in the same way as in Example 1, but herein gum arabic was used, instead of PVA, as the water-soluble bonding particles. The viscosity α of the slurry was 110 mPa·s.

Example 4

A powder for three-dimensional shaping and slurry according to the present example were prepared in the same way as in Example 1, but herein xanthan gum (KELZAN, by Sansho Co., Ltd.) was used, instead of PVA, as the water-soluble bonding particles. The viscosity α of the slurry was 7800 mPa·s.

Example 5

A powder for three-dimensional shaping and slurry according to the present example were prepared in the same way as in Example 1, but herein xanthan gum (KELZAN, by Sansho Co., Ltd.) was used, instead of PVA, as the water-soluble bonding particles; further, the content of the non-hydration reactive base particles was set to 98 parts by mass and the content of the water-soluble bonding particles was set to 2 parts by mass. The viscosity α of the slurry was 1300 mPa·s.

Example 6

A powder for three-dimensional shaping and slurry according to the present example were prepared in the same way as in Example 1, but herein an isobutylene resin A (ISOBAM 110, by Kuraray Co., Ltd.) was used, instead of PVA, as the water-soluble bonding particles. The viscosity $\alpha$ of the slurry was 900 mPa·s.

Example 7

A powder for three-dimensional shaping and slurry according to the present example were prepared in the same way as in Example 1, but herein an isobutylene resin A (ISOBAM 110, by Kuraray Co., Ltd.) was used, instead of PVA, as the water-soluble bonding particles; further, the content of the non-hydration reactive base particles was set to 99 parts by mass and the content of the water-soluble bonding particles was set to 1 part by mass. The viscosity $\alpha$ of the slurry was 60 mPa·s.

Example 8

A powder for three-dimensional shaping and slurry according to the present example were prepared in the same way as in Example 1, but herein an isobutylene resin B (ISOBAM 104, by Kuraray Co., Ltd.) was used, instead of PVA, as the water-soluble bonding particles. The viscosity $\alpha$ of the slurry was 400 mPa·s.

Example 9

A powder for three-dimensional shaping and slurry according to the present example were prepared in the same way as in Example 1, but herein the content of the non-hydration reactive base particles was set to 99 parts by mass and the content of the water-soluble bonding particles was set to 1 part by mass. The viscosity $\alpha$ of the slurry was 36 mPa·s.

Example 10

A powder for three-dimensional shaping and slurry according to the present example were prepared in the same way as in Example 1, but herein the content of the non-hydration reactive base particles was set to 85 parts by mass and the content of the water-soluble bonding particles was set to 15 parts by mass. The viscosity $\alpha$ of the slurry was 2500 mPa·s.

Example 11

A powder for three-dimensional shaping and slurry according to the present example were prepared in the same way as in Example 1, but herein the content of the non-hydration reactive base particles was set to 80 parts by mass and the content of the water-soluble bonding particles was set to 20 parts by mass. The viscosity $\alpha$ of the slurry was 4800 mPa·s.

Example 12

A powder for three-dimensional shaping and slurry according to the present example were prepared in the same way as in Example 1 but herein the content of the non-hydration reactive base particles was set to 50 parts by mass and the content of the water-soluble bonding particles was set to 50 part by mass. The viscosity $\alpha$ of the slurry was 22000 mPa·s.

Example 13

A powder for three-dimensional shaping and slurry according to the present example were prepared in the same way as in Example 1, but herein silica particles having an average particle size of 80 µm were used, instead of the alumina particles having an average particle size of 40 µm, as the non-hydration reactive base particles. The viscosity $\alpha$ of the slurry was 1320 mPa·s.

Example 14

A powder for three-dimensional shaping and slurry according to the present example were prepared in the same way as in Example 1, but herein silica particles having an average particle size of 15 µm were used, instead of the alumina particles having an average particle size of 40 µm, as the non-hydration reactive base particles. The viscosity $\alpha$ of the slurry was 1080 mPa·s.

Example 15

A powder for three-dimensional shaping and slurry according to the present example were prepared in the same way as in Example 1, but herein titania particles having an average particle size of 0.2 µm were used, instead of the alumina particles having an average particle size of 40 µm, as the non-hydration reactive base particles. The viscosity $\alpha$ of the slurry was 40000 mPa·s.

Example 16

A powder for three-dimensional shaping and slurry according to the present example were prepared in the same way as in Example 1, but herein titania particles having an average particle size of 2 µm were used, instead of the alumina particles having an average particle size of 40 µm, as the non-hydration reactive base particles. The viscosity $\alpha$ of the slurry was 5400 mPa·s.

Example 17

A powder for three-dimensional shaping and slurry according to the present example were prepared in the same way as in Example 1, but herein zirconia particles having an average particle size of 30 µm were used, instead of the alumina particles having an average particle size of 40 µm, as the non-hydration reactive base particles. The viscosity $\alpha$ of the slurry was 280 mPa·s.

Example 18

A powder for three-dimensional shaping and slurry according to the present example were prepared in the same way as in Example 1, except that herein no water-soluble bonding particles were used. The viscosity $\alpha$ of the slurry was 17 mPa·s.

<Crushing Strength Measurement>

The slurry of each example was poured into a plate coated with Teflon (registered trademark), and was dried for 24 hours. A test piece 10 mm wide, 30 mm long and 2.4 mm thick was cut out of each sample and was placed on a cylindrical stainless steel jig having a diameter of 12 mm. A pressure attachment was lowered while the attachment pressed against the test piece, and the load value (crushing strength: kg) upon breakage of the test piece was measured. The results are given in Table 1, FIG. 1 and FIG. 2. FIG. 1 is a graph illustrating the relationship between the viscosity α of the slurry and crushing strength. FIG. 2 is a graph illustrating a relationship between the content of water-soluble bonding particles and crushing strength. Samples having a crushing strength of 1 kg (=9.8 N) or higher were deemed to be good. Such a crushing strength is necessary in order for the three-dimensional shaped object after shaping to be removable from the shaping device without breaking. It is found, on the basis of preliminary experiments or the like, that a strong positive correlation exists (correlation coefficient of 0.8 or higher) between the crushing strength based on the above crushing test and the shaping strength of the three-dimensional shaped object that is actually shaped using a 3D printer.

object can be enhanced by using a powder for three-dimensional shaping in which the viscosity α of the slurry ranges from 30 mPa·s to 8000 mPa·s (preferably, from 400 mPa·s to 900 mPa·s).

As Table 1 and FIG. 2 reveal, it was found that in the case of the powder for three-dimensional shaping disclosed herein the crushing strength was enhanced (Examples 1 to 11, 13, 14, 16 and 17) by setting the content of water-soluble bonding particles to be equal to or greater than 1 part by mass. By contrast, in Example 12 where the content of water-soluble bonding particles was set to 50 parts by mass, the effect of enhancing crushing strength tended to be weaker than in Examples 1 to 11, 13, 14, 16 and 17, in which the content of water-soluble bonding particles was set to range from 1 part by mass to 20 parts by mass. The above results indicate that the content of the water-soluble bonding particles in the powder for three-dimensional shaping is preferably set to range from about 1 part by mass to 20 parts

TABLE 1

| | Non-hydration reactive base particles | | | Water-soluble bonding particles | | | |
|---|---|---|---|---|---|---|---|
| | Type | Average particle size (μm) | Content (parts by mass) | Type | Content (parts by mass) | Viscosity α (mPa · s) | Crushing strength (kg) |
| Example 1 | Alumina | 40 | 90 | PVA | 10 | 800 | 2.0 |
| Example 2 | Alumina | 40 | 90 | Melamine resin | 10 | 80 | 1.1 |
| Example 3 | Alumina | 40 | 90 | Gum arabic | 10 | 110 | 1.5 |
| Example 4 | Alumina | 40 | 90 | Xanthan gum | 10 | 7800 | 2.7 |
| Example 5 | Alumina | 40 | 98 | Xanthan gum | 2 | 1300 | 2.0 |
| Example 6 | Alumina | 40 | 90 | Isobutylene resin A | 10 | 900 | 4.8 |
| Example 7 | Alumina | 40 | 99 | Isobutylene resin A | 1 | 60 | 1.2 |
| Example 8 | Alumina | 40 | 90 | Isobutylene resin B | 10 | 400 | 4.5 |
| Example 9 | Alumina | 40 | 99 | PVA | 1 | 36 | 1.3 |
| Example 10 | Alumina | 40 | 85 | PVA | 15 | 2500 | 2.2 |
| Example 11 | Alumina | 40 | 80 | PVA | 20 | 4800 | 1.0 |
| Example 12 | Alumina | 40 | 50 | PVA | 50 | 22000 | 0.2 |
| Example 13 | Silica | 80 | 90 | PVA | 10 | 1320 | 2.0 |
| Example 14 | Silica | 15 | 90 | PVA | 10 | 1080 | 1.9 |
| Example 15 | Titania | 0.2 | 90 | PVA | 10 | 40000 | 0.2 |
| Example 16 | Titania | 2 | 90 | PVA | 10 | 5400 | 1.0 |
| Example 17 | Zirconia | 30 | 90 | PVA | 10 | 280 | 2.1 |
| Example 18 | Alumina | 40 | 100 | — | — | 17 | 0.0 |

As Table 1 and FIG. 1 reveal, a crushing strength of 1.0 kg or greater could be realized in the powders for three-dimensional shaping according to Examples 1 to 11, 13, 14, 16 and 17, in which the viscosity α of the slurry lay in the range 30 mPa·s to 8000 mPa·s, and the strength of the three-dimensional shaped object could be enhanced significantly as compared to that in Examples, 12, 15 and 18. In the case of the powder for three-dimensional shaping provided herein, the crushing strength of the three-dimensional shaped object tended to increase further (Examples 6 and 8) through setting of the viscosity α of the slurry to lie in the range 400 mPa·s to 900 mPa·s. It was found that, as a result, the mechanical strength of the three-dimensional shaped by mass. The viscosity α of the slurry in Example 15, where the average particle size of the non-hydration reactive base particles was set to 0.2 μm, was excessively high, and accordingly the crushing strength was lower than that in Examples 1 to 11, 13, 14, 16 and 17. This result indicates that the average particle size of the non-hydration reactive base particles is preferably greater than about 0.2 μm (preferably, 1 μm or greater).

Embodiments of the present invention have been described in detail above, but the embodiments are merely illustrative in nature, and are not meant to limit the scope of the claims in any way. The technical features set forth in the claims encompass various alterations and modifications of the specific examples illustrated above.

What is claimed is:

1. A method of fabricating a three-dimensional shaped object, the method comprising the steps of:
   (a) preparing a powder for three-dimensional shaping, the powder comprising non-hydration reactive base particles and water-soluble bonding particles;
   (b) filling the powder in a layer-like manner on a table;
   (c) adding a shaping solution to at least part of a layer of the powder to form a slurry, wherein 50 parts by mass of water is added to 100 parts by mass of the powder, viscosity of the slurry after 1 minute from the addition of the water ranges from 36 mPa·s to 7800 mPa·s;
   (d) solidifying the slurry mixture comprising the powder and the solution; and
   (e) repeatedly laying up solidified thin layers to form the three-dimensional shaped object which has a crushing strength of 1.0 to 4.8 kg,
wherein the shaping solution uses a solvent being water or an aqueous solvent consisting of water and an organic solvent which is an alcohol or a ketone that is homogeneously miscible with water.

2. The method according to claim 1, wherein the average particle size of the non-hydration reactive base particles ranges from 1 μm to 80 μm.

3. The method according to claim 1, wherein the content of the water-soluble bonding particles ranges from 1 part by mass to 20 parts by mass with respect to 100 parts by mass as a total amount of the powder.

4. The method according to claim 1, wherein the water-soluble bonding particles are made up mainly of at least one type selected from the group consisting of thermoplastic resins, thermosetting resins and polysaccharides.

5. The method according to claim 1, wherein the non-hydration reactive base particles are made up mainly of a metal containing at least one element selected from the group consisting of Al, Zr, Ti, Zn, Ni and Fe, or an alloy of the foregoing elements.

6. The method according to claim 1, wherein the non-hydration reactive base particles are made up mainly of an oxide containing at least one element selected from the group consisting of Al, Zr, Ti, Zn, Ni, Fe and Si.

7. The method according to claim 1, wherein the viscosity of the slurry after 1 minute from addition of the water ranges from 200 mPa·s to 5000 mPa·s.

8. The method according to claim 1, wherein the viscosity of the slurry after 1 minute from addition of the water ranges from 400 mPa·s to 900 mPa·s.

9. The method according to claim 1, wherein the average particle size of the non-hydration reactive base particles ranges from 10 μm to 70 μm.

10. The method according to claim 1, wherein the average particle size of the non-hydration reactive base particles ranges from 20 μm to 60 μm.

11. The method according to claim 1, wherein the average particle size of the non-hydration reactive base particles ranges from 30 μm to 50 μm.

12. The method according to claim 1, wherein the content of the water-soluble bonding particles ranges from 2 parts by mass to 15 parts by mass with respect to 100 parts by mass as a total amount of the powder.

13. The method according to claim 1, wherein the content of the water-soluble bonding particles ranges from 4 parts by mass to 10 parts by mass with respect to 100 parts by mass as a total amount of the powder.

\* \* \* \* \*